Oct. 4, 1960 A. J. HORNFECK 2,954,692
METER SYSTEMS
Original Filed March 18, 1950 2 Sheets-Sheet 2
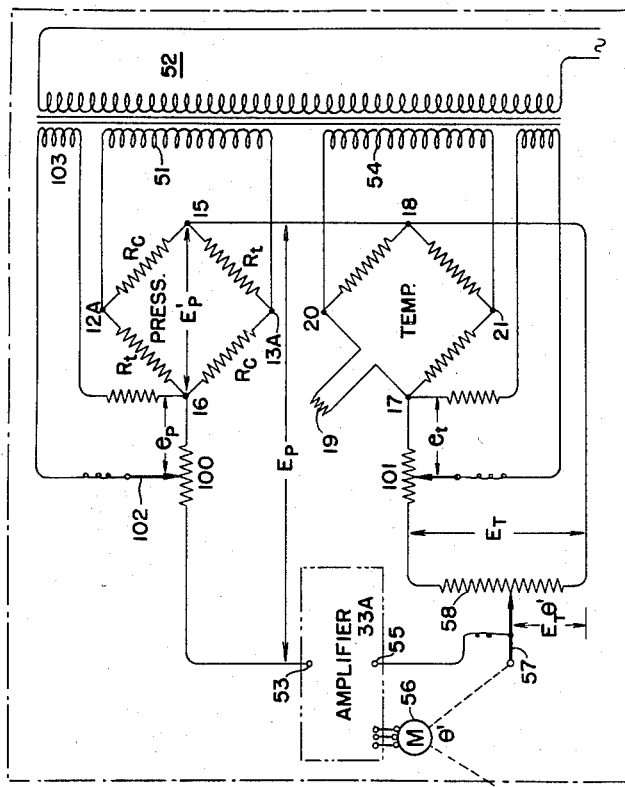
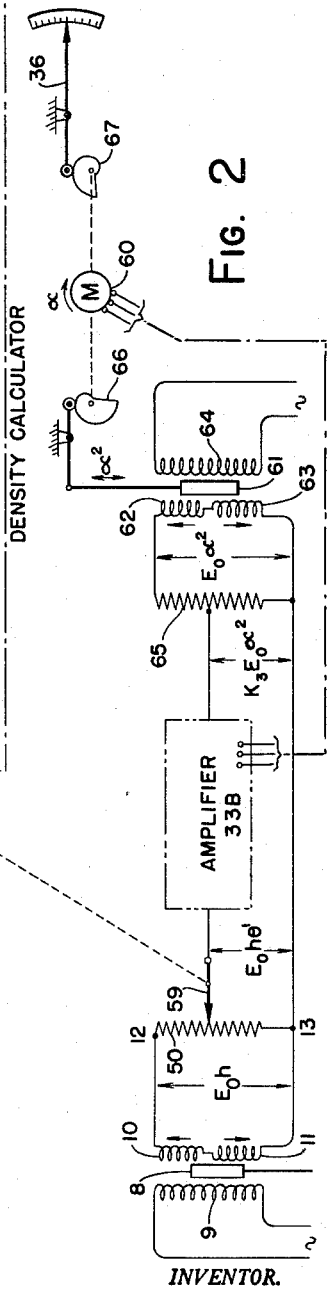
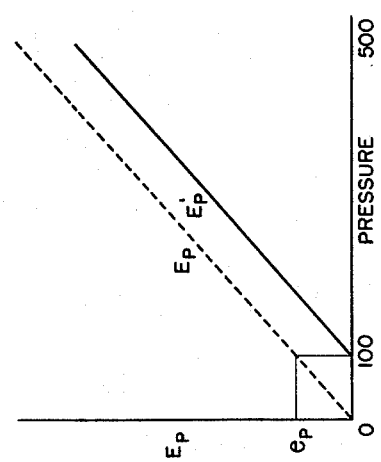
INVENTOR.
ANTHONY J. HORNFECK
BY
Raymond W. Jenkins
ATTORNEY United States Patent Office 2,954,692
Patented Oct. 4, 1960

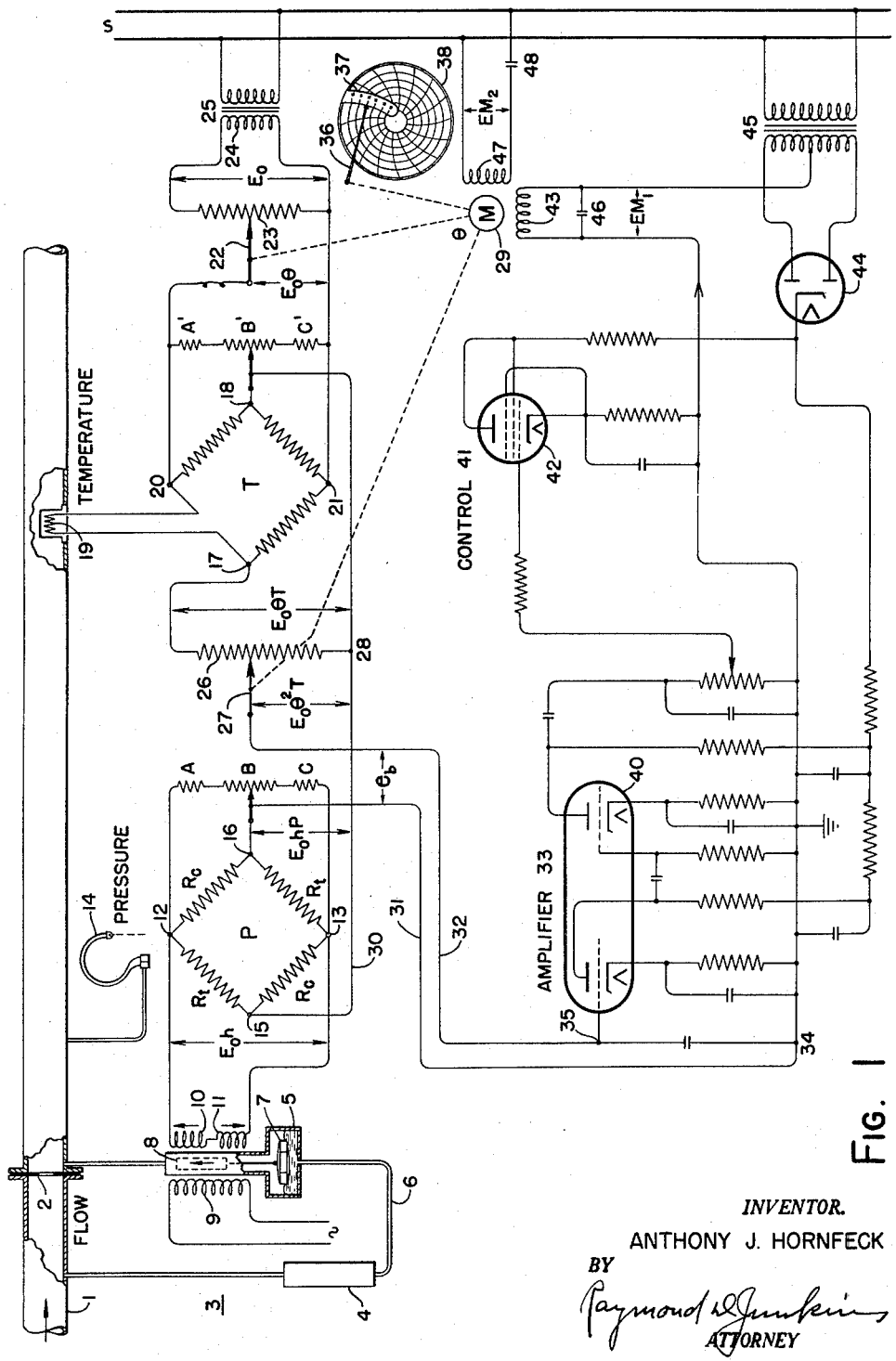

2,954,692

METER SYSTEMS

Anthony J. Hornfeck, South Euclid, Ohio, assignor to Bailey Meter Company, a corporation of Delaware Original application Mar. 18, 1950, Ser. No. 150,363, now Patent No. 2,718,144, dated Sept. 20, 1955. Divided and this application Apr. 13, 1955, Ser. No. 501,041

6 Claims. (Cl. 73—205)

This invention relates to electrical measuring and control systems, and particularly to balanceable electric networks for calculating the interrelation or functional values of variables. Such variables may be quantities, qualities, conditions, positions, or the like. For example such a variable may be the rate of flow of a fluid to be measured.

In the measurement or determination of a variable it is frequently desirable to give the result in terms of a function of the variable, or conversely it is frequently desirable to use a function of the variable in ascertaining the value of the variable. For example, in measuring or determining the volume rate of flow or weight rate of flow of a fluid through a conduit, it is more expeditious to employ the pressure differential produced by the fluid passing through a restriction in a conduit as an indication inferentially of the actual volume rate or weight rate of the fluid. A quadratic relation exists between such differential pressure and the actual rate of flow. The result, as for instance a visual indication or continuous record, is desirably to be in units of volume rate or weight rate per unit of time and frequently an integration with respect to time. Through the agency of my invention it is readily possible to have means sensitive to such a differential pressure and produce, at a local or remote location, a continuous visual indication in terms of weight rate or volume rate. In other words, to continuously extract the square root.

By way of specific example I have chosen to illustrate and describe a continuous calculating circuit involving the compensation of a fluid rate of flow for variations in its density from design conditions of density. Inasmuch as weight rate or volume rate of fluid flow is readily inferentially obtained by producing a pressure differential varying in functional relation with the rate of flow, I incorporate the extraction of the functional relation at the same time as making the necessary compensations for deviations in temperature, pressure or density of the fluid from design conditions.

It will be appreciated that I take this merely as a preferred example of variables interdependent upon each other and not as limiting.

In the drawings:

Fig. 1 is a schematic electric circuit for a fluid flow meter with temperature and pressure compensation.

Fig. 2 is a modification including a density calculator.

Fig. 3 is a graph in connection with Fig. 2.

In Fig. 1 I show diagrammatically a balanceable electrical network primarily useful, by way of example, in connection with the measurement of a variable, such as the rate of flow of a fluid through a conduit 1.

It is common in the metering art to insert a restriction, such as an orifice plate 2, in the path of the fluid flow and thus obtain a "head" or differential pressure bearing a functional relation to rate of fluid flow through the restriction. The relation between volume flow rate and differential pressure (head) is:

$$Q = cM\sqrt{2gh} \tag{1}$$

where $Q$ = cu. ft. per sec.
$c$ = coefficient of discharge
$M$ = Meter constant (depends on pipe diameter and diameter of orifice hole)
$g$ = acceleration of gravity = 32.17 ft. per sec. per sec.
$h$ = differential head in ft. of the flowing fluid The coefficient of discharge remains substantially constant for any one ratio of orifice diameter to pipe diameter regardless of the density or specific volume of the fluid being measured. With $c$, $M$ and $\sqrt{2g}$ all remaining constant then Q varies as $\sqrt{h}$.

If it is desired to measure the flowing fluid in units of weight then Equation 1 becomes:

$$W = cM\sqrt{2ghd} \tag{2}$$

where $W$ = rate of flow in pounds per sec.
$d$ = density in pounds per cu. ft. of the flowing fluid
$h$ = differential head in inches of a standard fluid such as water
$M$ = meter constant now including a correction between the density $d$ of the flowing fluid being measured and the density of the liquid in the manometer which is some standard such as water In each case, whether the measurement is in volume rate or in weight rate, it will be observed that the rate varies as $\sqrt{h}$, i.e. as the square root of the differential pressure measured across the orifice or other restriction 2.

It will further be noted that when a measurement in terms of weight rate of flow is desired the $d$ in Equation 2 is representative of density in pounds per cu. ft. of the flowing fluid under expected or design conditions of density. In other words, the flow metering system is designed to have a maximum capacity in weight rate of flow of fluid at a certain density, and the density of most fluids is a function of the fluid temperature and pressure. If the fluid is a true gas the relation of actual density to design density is directly with change in pressure and inversely with change in temperature. In accurately measuring the weight rate of fluid flow it becomes necessary, therefore, to continuously ascertain the density, or some function of the density, of the fluid as it is flowing past the point of measurement. If the actual density condition deviates from the design density condition, then a correction factor should be applied to the weight rate inferentially indicated as differential pressure or head.

Under certain conditions one of the variables of which density is a function, for example, either temperature or pressure, may remain constant and only one of them fluctuate. In this event a correction of the volume flow rate should be made for the fluctuating function of density so that a correct weight rate measurement will be obtained.

Numerous complicated metering arrangements have been proposed and used for extracting the square root relationship between head and rate. The simplest possible form of U-tube manometer with a float on the mercury in one leg will provide a measurement of the differential pressure. The complication occurs in the mechanism necessary to translate such float motion into terms of rate of flow.

In a large percentage of applications it is desired to provide one or more remote indications (or recordings) of the flow measurement. Various telemetric schemes have been proposed and used, either hydraulic, pneumatic or electrical.

My invention, as illustrated by one embodiment in Fig. 1, provides a simple and accurate solution of the problems above stated, namely, a remote visual indication of the measurement of a fluid flow in terms of weight rate compensated or corrected for deviations in actual density of the flowing fluid from design density as indicated by changes in temperature and/or pressure of the fluid.

Referring now specifically to Fig. 1, I show a flow meter 3 comprising a U-tube having legs 4 and 5 joined by a tube 6. A sealing liquid, such as mercury, partially fills the U-tube. On the surface of the mercury in leg 5 is a float 7 adapted to position a magnetic member such as a core piece 8 within a portion of the leg 5 of non-magnetic material.

The meter 3, which I will term the transmitter, comprises a movable core transformer having a primary alternating current energized winding 9 and a pair of bucking secondary windings 10, 11. The bucking secondary windings 10, 11 are inductively energized from the primary winding 9 through the agency of the core 8. When the core is in a central or neutral location relative the windings 9, 10 and 11 a voltage $E_0 h = 0$ exists across the terminals 12, 13. When the core is moved from neutral position toward one end of the coil assembly a voltage $E_0 h$ is developed as a function of core position and therefore of differential head ($h$) across the orifice restriction 2. The relation is linear over the operating range and $E_0 h$ varies from zero to a maximum finite value for values of ($h$=zero) to values of ($h$=maximum) under design conditions corresponding to maximum range of the apparatus. The voltage $E_0 h$ will always be of the same phase because the movement of core 8 never crosses the electrical neutral of 10, 11.

In Fig. 1 the voltage $E_0 h$ across the terminals 12, 13 provides the voltage supply for a Wheatstone bridge (P) having four resistance legs of which two are designated $R_t$ and two are designated $R_c$. The four resistance legs form the two tension and the two compression resistance elements of a strain gage, pressure-sensitive to the static pressure of the fluid flowing in the conduit 1. I have diagrammatically shown a pressure sensitive element at 14 as of the Bourdon tube type for pressure actuating the strain gage bridge elements, although the device 14 may comprise a diaphragm or other pressure sensitive instrumentality.

Such a pressure sensitive strain gage bridge is shown, for instance in Patent 2,470,714 issued May 17, 1949, to Nevius for Electric Pressure Indicator and need not be further described here. When supplied with an input voltage $E_0 h$ across the terminals 12, 13 it will develop at its output terminals 15, 16 a voltage $E_0 h P$ in functional relation to the existing differential head and the existing static pressure of the flowing fluid, to the end that the resultant voltage $E_0 h P$ is directly representative of differential head multiplied by a pressure value.

The bridge P differs from the usual concept of a Wheatstone bridge in that it is never balanced at any working pressure. The values of the resistance legs are so chosen that for a constant input voltage applied to terminals 12, 13 there will be an output voltage across output terminals 15, 16 bearing a definite (preferably linear) relation to the static pressure in conduit 1 which mechanically strains the tension elements $R_t$ and the compression elements $R_c$. If the input voltage across terminals 12, 13 is variable (as $E_0 h$ is with relation to the position of core 8) then the output voltage across 15, 16 has a value $E_0 h P$.

Connected across the terminals 12, 13 I show fixed resistances A, C and an adjustable resistance B. The arrangement allows handling of what is referred to as a suppressed range of pressure. Assume, for example, that the expected variations in pressure within the conduit 1 fall within the range 300 to 500 p.s.i. Greater sensitivity and accuracy will be obtained if the instrument is designed and calibrated for a suppressed range of 300–500 than if calibrated for a range of 0–500. Resistances A, B and C give this possibility by allowing a biasing of the bridge P effective for all values of input voltage $E_0 h$.

If the desired pressure range starts at zero then B is adjusted so that bridge P is balanced for zero pressure at any input voltage $E_0 h$. Thus the output $E_0 h P$ would be zero, regardless of $E_0 h$ when pressure is zero.

If the desired pressure range is, for example, 300–500 p.s.i., the bridge is normally designed to be unstrained and in balance at pressures below 300 p.s.i. Resistance B allows an initial unbalance equivalent of 300 p.s.i., so that for an operating pressure range of 300–500 p.s.i. the output voltage P will be directly representative of pressure and the voltage $E_0 h P$ will represent the actual value of head for the actual pressure.

A second Wheatstone bridge T provides a voltage output at terminals 17, 18 in functional relation to the actual temperature of the fluid in the conduit 1. To this end the Wheatstone bridge T has four arms of which the arm 19 comprises a resistance thermometer element sensitive to temperature of the flowing fluid and always producing an unbalance of the bridge and an output voltage varying with fluid temperature.

The input terminals 20, 21 of the bridge T are supplied with a voltage $E_0 \theta$ as determined by the position of a movable contact arm 22 along a resistance 23 which latter bridges the secondary 24 of a transformer 25. The voltage output of the secondary 24 is designated as $E_0$ and the mechanical positioning of the arm 22, or percentage of its possible motion over the resistance 23 is designated as $\theta$. Therefore, the voltage input at terminals 20, 21 is equal to $E_0 \theta$.

With the bridge T supplied with an adjustable voltage $E_0 \theta$ the output of the bridge T across the terminals 17, 18 is equal to $E_0 \theta T$ and this is applied across a fixed resistor 26 having a movable contact arm 27, to the end that the voltage between the contact arm 27 and a terminal 28 is $E_0 \theta^2 T$ when the two contact arms 22 and 27 are simultaneously moved in the same direction a distance, or proportionate distance $\theta$, by a common driving motor 29. It is a matter of practical design that potentiometers 22, 23 and 26, 27 are located at opposite sides of the bridge T. If grouped on one side only it would increase the difficulty of design and range for production of the voltage $E_0 \theta^2 T$ for comparison with voltage $E_0 h P$.

The circuit components so far described are included in a balanceable network having a conductor 30 which joins the terminals 15, 28 and 18. The terminals 16 and 27 are joined by conductors 31, 32 respectively to an amplifier 33 which is sensitive to the phase and magnitude of any unbalance of voltage in the balanceable network. Considering the network as a whole a voltage $e_b$ is representative of unbalance voltage across the conductors 31, 32 and when $e_b = 0$ the network is in balance.

When I speak of the phase of the unbalance voltage $e_b$ I mean the direction of unbalance, as to whether $E_0 \theta^2 T$ predominates over $E_0 h P$, or vice versa. The phase of the voltage $E_0 h$ does not reverse because all mechanical movement of core 8 is in one direction from the electrical neutral of transformer 9, 10, 11. Furthermore, the phase of input voltage $E_0$ remains constant as predetermined. Thus the phase of voltage $e_b$ is determined by, and is representative of, direction of unbalance of the network as a whole.

The final voltage across the terminals 27, 28 is proportional to temperature times the square of the angular movement of the arms 22 and 27. At balance this voltage $E_0 \theta^2 T$ must equal the voltage output of the strain gage or $E_0 h P$. Consequently, at balance the value $\theta$ or the movement of the slidewire arms 22 and 27 is proportional to the square root of the differential pressure drop multiplied by the density correction factor and this of course is corrected flow.

At balance $$e_b = 0$$
$$E_0 hP = E_0 \theta^2 T$$

or $$\theta = \sqrt{\frac{hP}{T}} = \text{corrected flow}$$

It will be appreciated that the unbalance signal $e_b$ appearing at the terminals 34, 35 as input to the amplifier 33 will be of zero value or of a phase and magnitude depending respectively upon the direction and magnitude of unbalance of the measuring network. In other words as voltages $E_0 hP$ and $E_0 \theta^2 T$ are in phase, if the voltage $E_0 hP$ predominates over the voltage $E_0 \theta^2 T$ then the unbalance signal $e_b$ will be of predetermined phase while if the voltage $E_0 \theta^2 T$ predominates over $E_0 hP$ the unbalance signal $e_b$ will be of opposite phase. In either event the magnitude of the voltage $e_b$ will depend upon the extent of unbalance between the conductors 31, 32.

For positioning the balancing arms 22, 27 I have indicated a motor 29 which is also arranged to position an indicator 36 relative to an index 37 and to a revoluble chart 38. Proportionate simultaneous movement of the elements 22, 27, 36, by the motor 29, is designated as $\theta$.

Between the A.-C. input signal $e_b$ at terminals 34, 35 and the motor 29 is a two stage amplifier 33 including a double triode electron tube 40. The signal $e_b$ of one phase acts through the amplifier 33 (which is phase sensitive) and through a motor control section 41 to cause rotation of the motor 29 in predetermined direction to position the arms 22 and 27 to vary the voltage $E_0 \theta^2 T$ to rebalance the network.

As previously stated the phase of the voltage $e_b$ depends upon the direction of unbalance between the conductors 31, 32. Likewise the phase of the output voltage of the amplifier 33 will depend upon the sense of unbalance. All or part of the output voltage of the amplifier is impressed upon the motor control circuit 41. The motor control circuit is arranged to sense the phase of the output of the amplifier and consequently the unbalance of the measuring circuit and is therefore adapted to effect an operation of the motor 29 to rebalance the measuring circuit.

The control circuit consists of a single tube 42, preferably of the high Gm or mutual conductance type, such as the 6AG7. This tube is connected in series with a control winding 43 of the motor 29.

The plate voltage for the tube 42 is unfiltered pulsating D.-C. voltage obtained from a full wave rectifier tube 44 of the 6X5 type, receiving its power from a transformer 45 connected to the alternating current power source. The voltage output of the amplifier 33, produced by an unbalance of the measuring circuit, is applied to the grid of the motor control tube 42. This voltage applied to the control grid will cause an increase in the no-load plate current during the half cycle when it is in phase with the plate voltage and a decrease during the half cycle when it is out of phase. As a result, with a large grid signal, half wave pulses of D.-C. current will flow into the motor circuit comprised of the control winding 43 and a capacitor 46 in parallel. The phase of this pulsating current depends on the phase of the grid signal, and consequently on the direction of unbalance of the measuring circuit.

The motor 29 is in effect a two-phase motor which may be described as being a capacitor-run induction motor having a two phase stator winding and a high resistance squirrel cage type rotor. There are two identical but separate windings 43, 47, the winding 47 being connected in series with a capacitor 48 across the alternating current power line so that its voltage $EM_2$ leads the line voltage by nearly 90°. The capacitor 48 is chosen so that it is in resonance with the inductance of the winding 47 at the operating frequency and forms a series resonant circuit. This results in a voltage across the winding 47 which is approximately double the line voltage for the particular motor used.

The second winding 43, which I will term the control winding, while identical with the first winding 47 in construction, differs in that it has a capacitor 46 connected in parallel across it. The capacitor 46 is designed to produce a condition of parallel resonance at 60 cycles. The plate of the motor control tube 42 is always positive. At balance, some current flows during each half cycle of the applied plate voltage, but since this current is only slightly pulsating direct current and has no fundamental component of supply line frequency, no output torque on the motor is produced. Any tendency of the rotor to coast is restrained by the damping action of the D.-C. component which applies a braking action. As balance is approached from an unbalance condition there results a reduction in the fundamental component of supply line frequency in the output circuit of tube 42 and a consequent and simultaneous increase in the D.-C. component which produces a dynamic braking action and prevents over travel.

It will thus be seen that the circuit described in connection with Fig. 1 provides a balanceable calculating network controlling a motor 29 whose travel $\theta$ is representative of the square root of the differential pressure drop multiplied by the density correction factor in connection with the fluid flowing through conduit 1. Inasmuch as the indicator arm 36 is moved simultaneously with the balancing potentiometer arms 22 and 27 a position of the arm 36 relative to the index 37 and to the revoluble chart 38 is at all times representative of the value of corrected fluid flow rate and shows changes therein. I have thus provided an extremely simple and accurate calculating circuit, sensitive to a variable or to a function of a variable, compensated for certain changes in the variable, and producing a visual manifestation of the variable so compensated. Certain portions of the balancing circuit may comprise a telemetering distance between a transmitter and a receiver if desired. The circuit is particularly useful where it is not necessary or desirable to visually indicate or record the value of temperature and/or of pressure of the flowing fluid but merely to utilize their deviations from design value in automatically compensating or correcting the differential head to obtain a corrected flow rate.

In Fig. 2 I show a slight modification of the arrangement previously described and in which the "density calculator" may be in effect a separate calculating instrument and separately located if desired. Components of Fig. 2 which are the same as those in Fig. 1 bear the same reference numerals. The voltage $E_0 h$ impressed across the terminals 12, 13 is therefore representative of differential head of the fluid flowing through the orifice 2 through position of the core 8.

The "density calculator" has been shown as enclosed in dot-dash line and includes a pressure Wheatstone bridge and temperature Wheatstone bridge of a type similar to those shown in Fig. 1, which, it will be remembered, are always unbalanced to provide continuous output voltages. The density calculator itself has application in the measurement of the ratio of two factors which can be measured by Wheatstone bridge circuits. In the specific example shown the pressure is measured by means of a strain gage bridge having resistance elements sensitive to the strain produced by pressure acting on a bellows or diaphragm. The input to the pressure bridge across the terminals 12A, 13A comes from the secondary 51 of a transformer 52 while the output $E'_p$ of this bridge across the terminals 15, 16 is modified by a bias voltage $e_p$ to produce a final output voltage across the terminals 15, 53 designated as $E_p$.

Input to the terminals 20, 21 of the temperature bridge is from a secondary 54 of the transformer 52 while the output of the bridge at terminals 17, 18 is biased by a voltage $e_t$ to produce a final output $E_t$.

The biasing of the pressure and temperature effects, in Fig. 2, is somewhat different than in Fig. 1. Considering the pressure bridge, for example, it will be noted that I provide a resistor 100 in the conductor which joins bridge output terminal 16 with amplifier input terminal 53. An adjustable contact arm 102 engages the resistor 100. Across the terminal 16 and the contact arm 102 is connected a secondary 103 of the transformer 52. The arrangement provides an adjustable voltage $e_p$ which is additive to the bridge output $E'_p$ (across 15, 16) to result in a pressure representative voltage $E_p$ across terminals 15, 53.

Fig. 3 shows a plot of pressure against output voltage. The line $E'_p$ represents the output voltage across 15, 16 for a range in pressure of say 100–500 p.s.i. I then may introduce a bias voltage $e_p$ sufficient to raise the line to the dotted line $E_p$ which now passes through zero and lies parallel to $E'_p$. Thus by varying the value of the bias voltage $e_p$ I can operate on a substantially linear relation between output voltage $E_p$ and pressure over what I call a suppressed range of 100–500 p.s.i., rather than being limited to a range of 0–500 where I never expect to use that portion of the range 0–100 p.s.i.

The output voltages of the two Wheatstone bridges are connected into a ratio measuring circuit having final output terminals 53, 55 entering an amplifier 33A arranged to control a balancing motor 56. Amplifier 33A is the equivalent of amplifier 33 and motor control 41 of Fig. 1. The motor 56 moves through a proportionate travel designated $\theta'$ and simultaneously positions a contact arm 57 over a resistance 58 and a contact arm 59 over a resistance 50.

A voltage $E_t\theta'$ is imposed between terminals 55 and 18 by contact arm 57 positionable over resistor 58 to balance the network. If either $E_p$ or $E_t$ should change in value the network would become unbalanced. The unbalance voltage, effective upon amplifier 33A, would result in movement of motor 56 in proper direction and extent to shift arm 57 along 58 until balance were again attained. The movement $\theta'$ of motor 56 would be indicative of change in the density of the flowing fluid as evidenced by the change in ratio of the voltage values representative of temperature and pressure.

The resistance 58 is supplied with voltage $E_t$ while the resistance 50 bridges the terminals 12, 13 having the supply voltage $E_0h$.

$$E_p = KP$$
$$E_t = K_1 T$$

where K and $K_1$ are constants at balance and when $K = K_1$ $$E_t \theta' = E_p$$
$$\theta' = \frac{E_p}{E_t} = \frac{P}{T}$$

Thus the positioning of the arm 59 by the motor 56 is in accordance with $P/T$ or $\theta'$. Thus as a density factor, multiplied by the voltage across the resistor 50, results in a voltage $E_0h\theta'$ between the contact arm 59 and the terminal 13 at the entrance to an amplifier 33B, similar to amplifier 33 and motor control 41.

At the receiving end a motor 60 is controlled by the amplifier 33B to position a core 61 relative to secondary windings 62, 63 and the primary winding 64 of a movable core transformer similar to that at the head measuring transmitter. The output of the secondaries 62, 63 is caused to equal the supply voltage across the primary 64 multiplied by the square of the movement of motor 60, through the agency of a squaring cam 66.

The amplifier 33B is therefore sensitive to network unbalance.

At balance $$E_0 h\theta = K_3 E_0 \alpha^2$$

and $$\alpha = \sqrt{h\theta'} = \text{corrected flow}$$

The voltage $E_0h\theta'$ is proportional to the product of differential pressure multiplied by a correction factor. This voltage is balanced by the voltage developed by the receiver as $K_3 E_0 \alpha^2$.

I have shown that the motor 60, under the control of the amplifier 33B, simultaneously positions a linear rise cam 67 for moving the pointer 36 and a functional rise cam 66 for positioning the core 61. The motor rotation and the cam 67 being linear then the indicator pointer 36 is linear in motion while the movement of the core 61, through the agency of the cam 66, is in accordance with a quadratic relation.

While I have illustrated and described preferred embodiments of my invention, it will be understood that this is by way of example only and not to be considered as limiting.

This application is a division of my copending application SN 150,363 filed March 18, 1950, now Patent No. 2,718,144, granted September 20, 1955.

What I claim as new and desire to secure by Letters Patent of the United States, is:

1. In a compensator for correcting an electrical network type of fluid flow meter for density variations, a pressure-sensitive Wheatstone bridge responsive to the static pressure of the fluid and having an output circuit, a Wheatstone bridge sensitive to the temperature of the fluid and having an output circuit, a source of supply for the bridges, biasing means in each output circuit, a means for manually and individually varying the bias of each bridge output circuit, a balanceable network including each bridge output circuit and a device sensitive to the unbalance in said network, means for maintaining said network in balance controlled by the sensitive device, and means in said flow meter network connected for adjustment by said sensitive device to effect said correction.

2. A flowmeter comprising, in combination, a flow pipe having a restricted orifice, a U-tube connecting positions in the pipe on opposite sides of the orifice, a chamber in said tube containing a liquid, a float on said liquid, a core positioned by said float so that the flow rate varies as the square root of the core height, an A.-C. energized primary coil cooperating with said core, a pair of bucking secondaries spaced along said core whereby to deliver an A.-C. potential representative of the core position and of the square of the flow, a potentiometer shunting said secondaries and having a slider, a second A.-C. energized primary, core and secondaries, a network connecting said last mentioned secondaries to the output of said potentiometer, means responsive to the amount and direction of unbalance in said network including a motor, an indicator linearly actuated by said motor, a squaring cam for moving said last mentioned core from the motor to balance the network and cause said indicator to show the flow directly, a second motor to position said slider to apply to apply a correction factor to the flow rate, means to deliver a potential, of reversible phase and variable magnitude to said second motor including a Wheatstone bridge having an A.-C. energized input and an output circuit, means responsive to a condition of the fluid in said pipe to maintain said bridge continuously unbalanced to provide a voltage output representative of said condition, a second Wheatstone bridge having an A.-C. energized input and an output circuit, means responsive to a second condition of the fluid in said pipe to maintain the second bridge continuously unbalanced to provide a voltage output representative of said second condition, a potentiometer shunting the output circuit of one of said bridges, a slider for said last mentioned potentiometer connected to balance the voltage of the one bridge output circuit with that of the other and a driving connection from said second motor to last mentioned slider.

3. A system and apparatus for fluid flow measurement compensated for density including a balanceable electrical network including a movable core transformer producing a voltage representative of pressure differential across a constriction in the flow, and a second movable core transformer arranged to induce a voltage opposed to the output of the first movable core transformer; a density compensator for adjusting the voltage representative of pressure differential including a Wheatstone bridge sensitive to the temperature of the fluid and producing a voltage representative of the temperature, a strain gauge sensitive to the static pressure of the fluid and producing a voltage representative of the pressure, means connecting said last two mentioned voltages in opposition, a means sensitive to the differential of said opposed voltages which represents a deviation from a predetermined ratio of the temperature and pressure, means under the control of the sensitive means to adjust one of said last two mentioned voltages for balancing the compensator network including the temperature bridge and strain gauge and simultaneously affecting the said adjustment of the voltage representative of pressure differential, means sensitive to unbalance in said first network to adjust the second movable core transformer to produce a voltage equal to the said adjusted voltage representative of pressure differential, and an indicator driven by said last mentioned means which thereby indicates fluid flow compensated for density.

4. A measuring system comprising in combination, a transducer delivering a potential representative of the magnitude of a first variable, means providing a potential representative of the magnitude of a second variable, means providing a potental representative of the magnitude of a third variable, means connected to so combine the last two potentials as to determine the ratio between the magnitude of the second and third variables, means actuated by said last mentioned means arranged to modify the first potential in accordance with the value of said ratio, a further source of alternating current, means responsive to the difference between the potential from said last source and that from the transducer as modified to adjust the potential from said last source to maintain balance with the modified potential.

5. In a flow metering telemetering system, in combination, a transducer delivering an A.-C. potential representative in magnitude of the pressure differential on two sides of a meter orifice, means providing an A.-C. potential always representative in magnitude of the pressure of the metered fluid, means providing an A.-C. potential always representative in magnitude of the temperature of the metered fluid, means connected to so combine the last two potentials as to determine the pressure-temperature ratio, means actuated by said last named means to modify the first potential in accordance with the value of said ratio, a further source of alternating current, means responsive to the difference between the potential from said last source and that from the transducer as modified to adjust the potential from said last source to balance the modified potential; and an indicator movable by said last named means to indicate rate of flow as corrected for temperature and pressure.

6. The system as defined in claim 5 wherein the potentials representing temperature and pressure oppose each other, a first motor driven by the difference in said potentials, movement of said motor effecting the modification of said transducer potential; and the means for adjusting said further source of alternating current for balancing the modified output from the transducer and driving said indicator includes a second motor driven by the difference between the modified transducer potential and the potential of the further source of alternating current as adjusted.

References Cited in the file of this patent

UNITED STATES PATENTS

| | | |
|---|---|---|
| 1,573,850 | Naiman | Feb. 23, 1926 |
| 2,062,110 | Swartwout | Nov. 24, 1936 |
| 2,135,511 | Holven | Nov. 8, 1938 |
| 2,275,317 | Ryder | Mar. 3, 1942 |
| 2,330,427 | Hornfeck | Sept. 28, 1943 |
| 2,336,492 | MacKay | Dec. 14, 1943 |
| 2,363,690 | Razek | Nov. 28, 1944 |
| 2,501,377 | Cherry | Mar. 21, 1950 |
| 2,593,661 | Dickey | Apr. 22, 1952 |
| 2,662,540 | Rutherford | Dec. 15, 1953 |
| 2,689,932 | Hornfeck | Sept. 21, 1954 |
| 2,718,144 | Hornfeck | Sept. 20, 1955 |